United States Patent [19]

Mink et al.

[11] Patent Number: 4,516,989
[45] Date of Patent: May 14, 1985

[54] PROCESS FOR REMOVING FLY ASH PARTICLES FROM A GAS AT ELEVATED PRESSURE

[75] Inventors: Bernardus H. Mink; Willem J. A. H. Schoeber, both of The Hague, Netherlands

[73] Assignee: Shell Oil Company, Houston, Tex.

[21] Appl. No.: 615,849

[22] Filed: May 31, 1984

Related U.S. Application Data

[63] Continuation of Ser. No. 429,779, Sep. 30, 1982, abandoned.

[30] Foreign Application Priority Data

Dec. 30, 1981 [NL] Netherlands ............... 8105903

[51] Int. Cl.³ .................................. B01D 45/12
[52] U.S. Cl. .................................. 55/68; 55/1; 55/431
[58] Field of Search ............. 55/1, 52, 204, 205, 55/459 R, 459 A–459 D, 410, 428–433, 68; 209/144, 211; 210/787, 788, 115, 512.1, 512.2

[56] References Cited

U.S. PATENT DOCUMENTS

| | | | |
|---|---|---|---|
| 2,379,411 | 7/1945 | Berges | 210/788 X |
| 2,765,867 | 10/1956 | Revallier et al. | 55/205 X |
| 3,264,800 | 8/1966 | Wittmann | 55/1 |
| 3,276,592 | 10/1966 | Neuman | 210/512.1 X |
| 3,583,910 | 6/1971 | Stoddard | 210/512.1 X |
| 3,764,005 | 10/1973 | Zemanek | 209/211 |
| 3,776,385 | 12/1973 | Maciula et al. | 210/512.1 X |
| 3,877,904 | 4/1975 | Lowrie | 55/459 R X |
| 3,988,133 | 10/1976 | Schady | 55/459 R |
| 4,147,630 | 4/1979 | Laval, Jr. | 55/459 R X |
| 4,212,653 | 7/1980 | Giles | 55/1 |
| 4,244,708 | 1/1981 | Bielefeldt | 55/459 R X |
| 4,279,627 | 7/1981 | Paul et al. | 55/431 X |

FOREIGN PATENT DOCUMENTS

| | | | |
|---|---|---|---|
| 144663 | 11/1979 | Japan | 55/431 |
| 700511 | 12/1953 | United Kingdom | 55/431 |
| 611679 | 6/1978 | U.S.S.R. | 55/459 R |

Primary Examiner—Robert Spitzer

[57] ABSTRACT

In a process for separating fly-ash from crude synthesis gas a high-pressure cyclone is used, having a central pipe ranging from above its gas outlet to below its solids outlet. Through this pipe gas is removed which emanates from a sluice system to which the cyclone is connected by means of its solids outlet. In this way the efficiency of the cyclone is improved.

8 Claims, 1 Drawing Figure

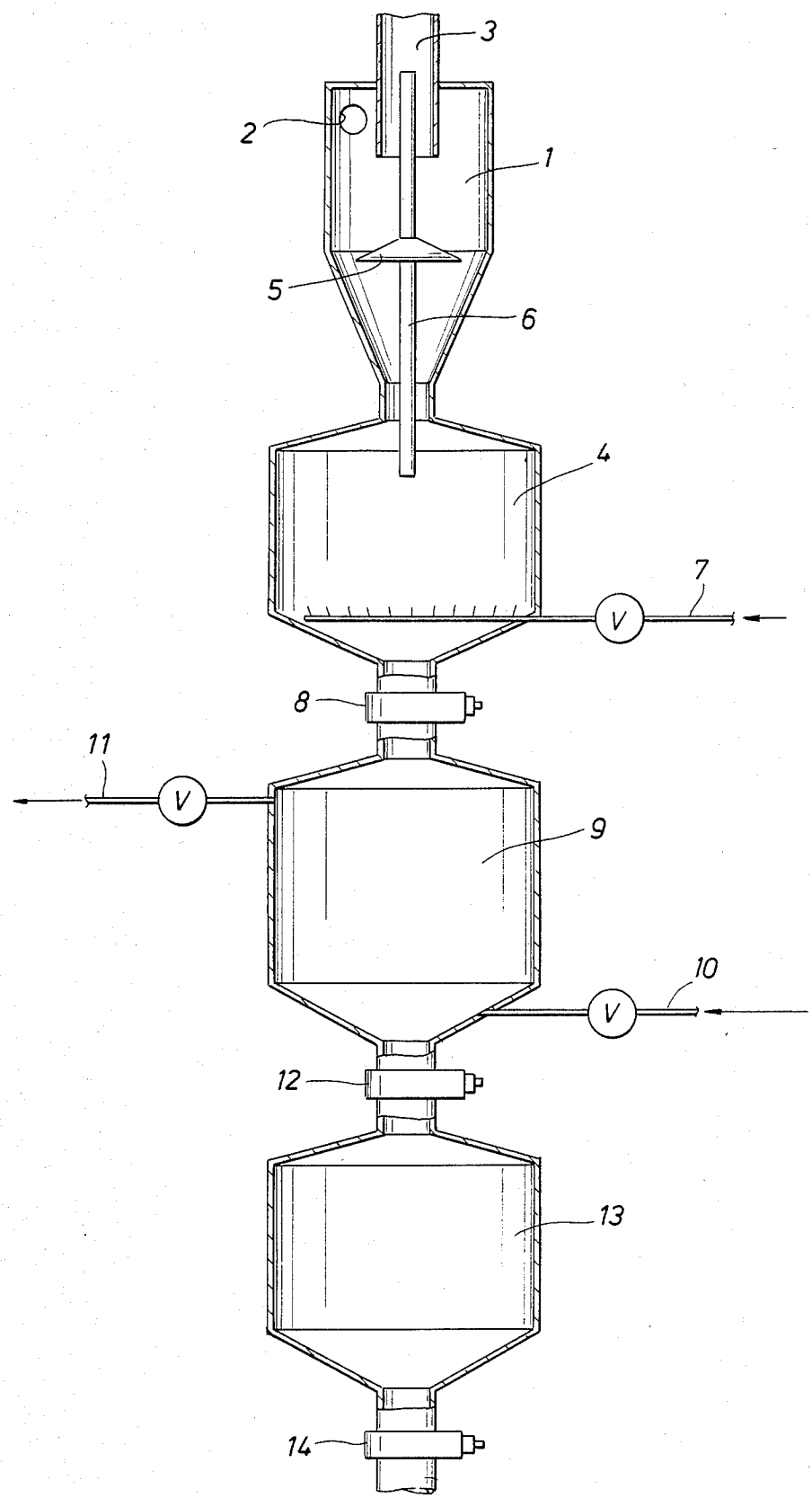

PROCESS FOR REMOVING FLY ASH PARTICLES FROM A GAS AT ELEVATED PRESSURE

This is a continuation of application Ser. No. 429,779, filed Sept. 30, 1982, now abandoned.

FIELD OF THE INVENTION

The invention relates to a process for removing solid particles from a gas at elevated pressure by means of a cyclone.

BACKGROUND OF THE INVENTION

Solid particles can be removed from a gas by introducing the gas tangentially into a cyclone. Separation then takes place between the gas and the solid particles entrained by the gas. The gas leaves the cyclone via the gas outlet at the top of the cyclone. The solid particles are discharged at the bottom of the cyclone.

When the cyclone operates at elevated pressure, problems may arise during the discharge of the solid particles. For discharging the solid particles to a vessel having a lower, usually atmospheric, pressure it is necessary to use a sluice. In that case the solid particles are first collected in a collecting vessel, the solid particles are allowed to flow into the sluice. The pressure in the sluice is then decreased to substantially the pressure in the vessel having a lower pressure. The solid particles are then transferred to the latter vessel. The sluice is thus alternately filled and emptied. This implies that the collecting vessel is also emptied at intervals.

When the solid particles flow from the collecting vessel into the sluice, gas displaced from the sluice flows into the collecting vessel. Since the solid particles may agglomerate in the collecting vessel and form a more or less compact mass, it is desirable that the solid should be shaken loose when the collecting vessel is being emptied. This is preferably performed by creating a slight excess pressure in the sluice in relation to the collecting vessel. When the connection between the sluice and the collecting vessel is opened, a gas stream resulting from said excess pressure will shake loose the solid particles. The excess pressure is preferably up to 5% of the absolute pressure in the collecting vessel.

If no special measures are taken, a quantity of the gas displaced from the sluice by the solid particles enters the cyclone via the solids outlet. This is caused by the excess pressure in the sluice and the velocity at which the gas is displaced from the sluice. Gas flowing into the cyclone via the solids outlet has an unfavorable effect on the operation of the cyclone. The present invention aims at providing a process for removing solid particles from a gas, in which process gas is prevented from entering the cyclone via the solids outlet.

SUMMARY OF THE INVENTION

The invention therefore relates to a process for removing solid particles from a gas at elevated pressure by means of a cyclone, characterized in that the solid particles separated off are collected in a collecting vessel that is at intervals emptied via a sluice into a vessel having a lower pressure, and gas entering the collecting vessel having a lower pressure, and gas entering the collecting vessel while the latter is being emptied is discharged via a pipe coaxially arranged in the cyclone and extending from the collecting vessel to a point in the gas outlet of the cyclone.

BRIEF DESCRIPTION OF THE DRAWING

The single FIGURE is a schematic drawing of the present process for removing solid particles such as fly ash from a gas (e.g. synthesis gas).

DESCRIPTION OF THE PREFERRED EMBODIMENT

Not all materials will spontaneously flow from the collecting vessel into the sluice. With some materials the particles can agglomerate and clog the supply opening of the sluice. In order to prevent this, provisions can be made near said supply opening. For example, it is possible to reduce agglomeration by mechanical jogging means. A preferred method comprises fluidizing the solid particles in the collecting vessel by supplying an additional quantity of gas. In the fluidized state the solid particles will readily flow into the sluice.

With some materials it is advisable to continuously supply additional gas into the collecting vessel in order to prevent the formation of a compact mass. With other materials it is sufficient to fluidize the solid particles shortly before emptying the collecting vessel.

Together with the excess gas displaced from the sluice by the solid particles, the gas introduced into the collecting vessel for fluidizing purposes according to the preferred embodiment of the present invention, is discharged via the pipe extending into the gas outlet of the cyclone.

In the cyclone two rotary, helical movements occur, which are known as vortices, an inner and an outer vortex. The outer vortex extends from the inlet where the solids-containing gas is tangentially introduced into the cyclone, and subsequently moves downwards to the solids outlet, entraining the solid particles. The inner vortex starts near the solids outlet, makes an upward movement to the gas outlet and consists of gas that is substantially free of solid particles. In order to cause the least possible disturbance in said vortices, which are necessary for the effectiveness of the cyclone, the pipe is coaxially arranged in the cyclone.

The fact that the pipe extends from the collecting vessel to a point in the gas outlet ensures that the gas cannot flow into the cyclone. The gas entering the collecting vessel will not flow through the annular opening formed between the solids outlet and the pipe, since the solid particles flowing downwards offer a relatively high degree of resistance, whereas in the pipe there is no obstruction at all, so that the latter has a relatively low degree of resistance.

The pipe diameter depends on the quantity of gas to be discharged by the pipe. Said quantity is determined by the quantity of solid particles discharged each time the collecting vessel is emptied into the sluice, and by the quantity of gas, if any, introduced for fluidizing purposes. The quantity of fluidizing gas depends on the nature of the solid particles. Some materials have a high degree of bed expansion; that is to say, a relatively large quantity of gas is necessary for fluidizing the material. Consequently, in that case a larger quantity of gas will have to be introduced than in the event of materials having a low degree of bed expansion and, consequently, the pipe diameter will be larger.

Solid particles can be entrained upwards by the inner vortex starting near the solids outlet. The degree of separation between gas and solid particles is then adversely affected. In order to eliminate said drawback a round plate to prevent solid particles being entrained is preferably secured to the pipe. More preferably, a conical plate is secured to the pipe for said purpose. In this case the top of the cone points at the gas outlet.

The plate is preferably secured to the pipe at the place where the cylindrical part of the cyclone becomes the conical part. The diameter of the plate must be such that disturbance of the outer vortex is kept to a minimum. On the other hand, the diameter must be large enough to effectively reduce the entrainment of solid particles by the rising gas. Consequently, the plate diameter is preferably 60–85% of the inside diameter of the cyclone.

The vessel having a lower pressure will usually be at atmospheric pressure. However, this is not necessary. The process according to the invention can be used for any cyclone, provided the pressure in the vessel having a lower pressure is indeed lower than the operating pressure of the cyclone. The process according to the invention is extremely suitable if the pressure difference between the cyclone and the vessel having a lower pressure is 5–40 bar.

The requirements made for the gas introduced into the collecting vessel for fluidizing purposes are only that the gas is inert with respect to the solid particles and with respect to the gas from which the solid particles are separated. Said requirements are fulfilled by many gases. Particularly suitable is a gas having the same composition as the gas from which the solid particles are separated. For example, a quantity of the gas purified by means of the present process can be recycled to fluidize the solid particles. This has the advantage that the purified gas is not contaminated by another gas. The gas displaced from the sluice by the solid particles is a portion of the gas by means of which the sluice has been pressurized. The requirements for said gas are the same as for the fluidizing gas. A gas with the same composition as the gas from which the solid particles are separated is also very suitable therefor. For example, a quantity of the gas purified by the present process can be passed to the sluice in order to bring the sluice to the correct pressure. For emptying the sluice the pressure must be reduced to substantially the pressure of the vessel having a lower pressure. When the pressure in the sluice is reduced by venting gas from the sluice to the atmosphere, it must be ensured that no air pollution can take place. The former gas is then not always suitable. Use must then be made of a harmless gas, such as nitrogen, carbon dioxide, etc.

The process according to the invention is particularly suitable for removing fly ash from a gas stream. Fly ash is the solid matter entrained by the product cases in the combustion or gasification by partial combustion of carbon-containing fuel. As fuel many materials, such as coal, brown coal, tar, peat, wood, petroleum and petroleum fractions, oil recovered from tar sand, shale oil etc., can be considered.

In the gasification of carbon-containing fuel the gas from which the fly ash is separated substantially consists of carbon monoxide and hydrogen. As stated above, the gas used to bring the sluice to the correct pressure and the fluidizing gas may consist of a portion of the gas purified by the present process. Nitrogen and carbon dioxide or mixtures of said gases are also suitable therefor.

The invention will now be illustrated with reference to the FIGURE. It will be understood that the invention is not to be so limited and that various modifications will be apparent to one skilled in the art which are within the scope of the present invention.

A gas stream containing solid particles is tangentially introduced into a cyclone 1 at high pressure through an inlet 2. A separation takes place between the gas, which leaves the cyclone via a gas outlet 3, and the solid particles, which are collected in a collecting vessel 4. By means of a conical plate 5 on a pipe 6 solid particles are prevented from being entrained by the gas and discharged via the gas outlet 3.

While solid particles accumulate in the collecting vessel 4, a sluice 9 is pressurized to substantially the same pressure as the collecting vessel 4 by means of a line 10. Gas is added through a line 7 in order to fluidize the solid particles in the collecting vessel 4.

When the desired quantity of solid particles has been collected in the collecting vessel 4, a valve 8 is opened so that the solid particles flow from the collecting vessel 4 into a sluice 9. The gas that consequently flows into the collecting vessel 4, together with the gas introduced through the line 7, is discharged via the pipe 6 extending into the gas outlet 3. When the desired quantity of solid particles has flowed into the sluice 9, the valve 8 is closed. Unless the gas supply through the line 7 is continuous, it is now cut off. The pressure in the sluice is reduced to substantially the pressure in a vessel 13 via a line 11. A valve 12 is opened and the solid particles then flow into the vessel 13. After the sluice 9 is emptied, the valve 12 is closed. The pressure in the sluice 9 is subsequently again increased to substantially the pressure in the collecting vessel 4. The solid particles in the vessel 13 can be discharged via a valve 14.

The sluice 9 and the vessel 13 can be equipped with provisions to reduce the agglomeration of the solid particles. Said provisions, for example, consist of mechanical jogging means or gas supply lines for fluidizing the solid particles (the latter are not shown on the drawing).

We claim:

1. A process for removing fly ash particles from a gas at elevated pressure comprising separating the fly ash particles in a cyclone, and collecting the separated fly ash particles in a collecting vessel, emptying said vessel at intervals via a sluice into a vessel having a lower pressure, the gas entering the collecting vessel from the sluice while the vessel is being emptied being discharged via a pipe coaxially arranged in the cyclone and extending from the collecting vessel to a point in the gas outlet of the cyclone.

2. The process of claim 1, wherein the gas entering the collecting vessel while the latter is being emptied consists of gas flowing from the sluice into the collecting vessel and gas introduced into the collecting vessel.

3. The process of claim 2 wherein fly ash particles are prevented from upward entrainment in the cyclone by a round or conical plate coaxially mounted on the pipe inside the cyclone.

4. The process of claim 3, wherein the plate is secured at the plate where the cylindrical part of the cyclone becomes the conical part.

5. The process of claim 4, wherein the diameter of the plate is 60–85% of the inside diameter of the cyclone.

6. The process of claim 1 wherein the gas entering the collecting vessel while the latter is being emptied, has the same composition as the gas from which the solid particles are separated.

7. The process of claim 1, wherein the pressure difference prevailing between the cyclone and the vessel having a lower pressure is 5–40 bar.

8. The process of claim 1, wherein the gas entering the collecting vessel while the latter is being emptied is nitrogen and/or carbon dioxide.

* * * * *